United States Patent [19]

Anderson et al.

[11] 4,005,383
[45] Jan. 25, 1977

[54] CATACOUSTIC NAVIGATING SYSTEM

[75] Inventors: Phillip R. Anderson, Ellicott City; Robert P. van Eepoel, Catonsville, both of Md.

[73] Assignee: The United States of America as represented by the Secretary of the Navy, Washington, D.C.

[22] Filed: Feb. 12, 1960

[21] Appl. No.: 8,471

[52] U.S. Cl. .............................. 340/3 R; 340/8 FT
[51] Int. Cl.² ........................................ G01S 9/66
[58] Field of Search .............. 340/3, 4, 5, 16, 8 RT, 340/6, 3 R, 8 FT

[56] References Cited

UNITED STATES PATENTS

| 1,388,949 | 8/1921 | Hanson | 340/4 |
|---|---|---|---|
| 1,441,002 | 1/1923 | Kitchin | 340/4 |
| 1,470,389 | 10/1923 | Rellstab | 340/4 |
| 1,610,779 | 12/1926 | Hewett | 340/5 |
| 2,406,512 | 8/1946 | Ryan | 340/4 |
| 2,428,360 | 10/1947 | Dingley | 340/4 |
| 2,461,005 | 2/1949 | Southworth | 343/18 |
| 2,461,181 | 2/1949 | Rosenberg | 340/8 |
| 2,463,474 | 3/1949 | Busignies | 343/18 |
| 2,789,382 | 4/1957 | Fruengel | 340/3 |
| 2,910,666 | 10/1959 | Hardgrove et al. | 340/5 |
| 2,966,655 | 12/1960 | Thiede | 340/3 |
| 3,005,973 | 10/1961 | Kietz | 340/3 |
| 3,014,198 | 12/1961 | Harris | 340/5 |

FOREIGN PATENTS OR APPLICATIONS

| 1,042,439 | 10/1958 | Germany | 340/4 |
|---|---|---|---|
| 823,304 | 11/1959 | United Kingdom | 340/3 |

Primary Examiner—Richard A. Farley
Attorney, Agent, or Firm—Louis A. Miller; Rolla N. Carter

EXEMPLARY CLAIM

1. A channel defining system for aiding the navigation through a body of water of a vessel equipped with a high resolution pulsed catacoustic system adapted to scan the bottom in range abeam of the vessel comprising
   an elongated buoyant ridge-like strip of acoustic reflecting material extending lengthwise of the channel on the channel bottom and laterally spaced from the center line of the channel by a substantially constant known distance, and
   anchoring weights secured to said strip at spaced positions along its length.

1 Claim, 5 Drawing Figures

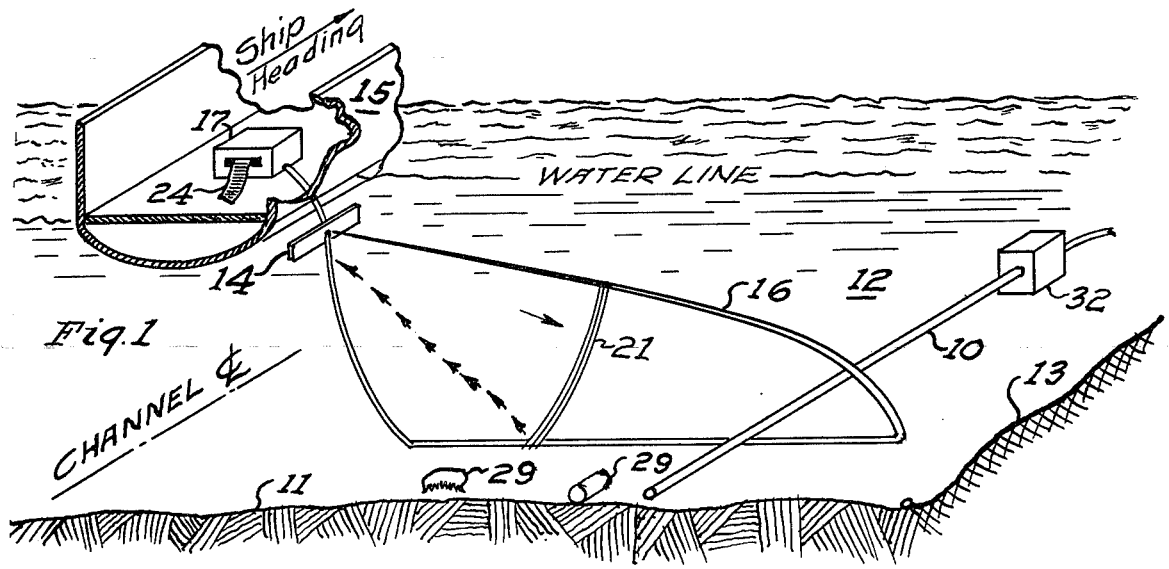
Fig. 1
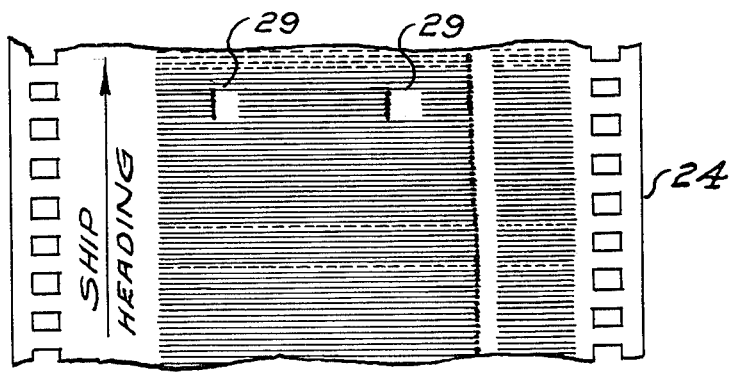
Fig. 2
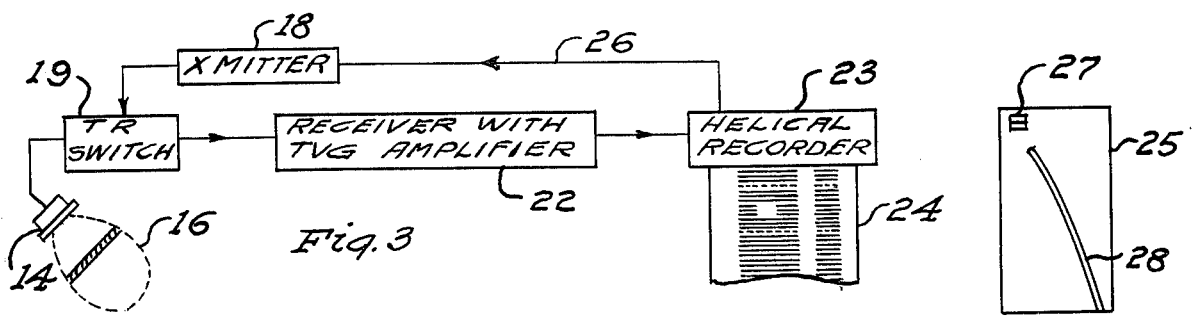
Fig. 3
Fig. 4
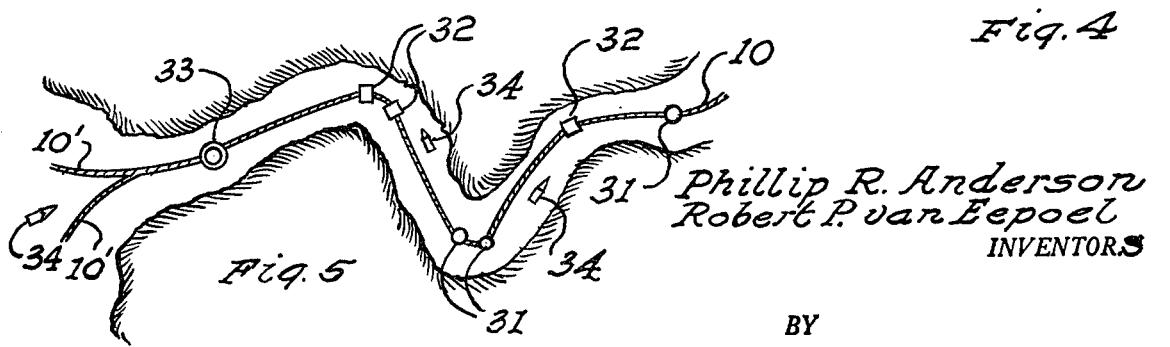
Fig. 5
Phillip R. Anderson
Robert P. van Eepoel
INVENTORS

CATACOUSTIC NAVIGATING SYSTEM

The present invention relates to navigation in crowded harbors, narrow channels and other restricted waters where precise navigation is a necessity under all weather and visibility conditions and more particularly to a novel catacoustic system with which a ship can be piloted along predetermined lanes in narrow channels including those extending through mined areas. The system utilizes underwater compressional waves and therefore is not concerned with the presence or absence of light.

The navigation of a channel is always hazardous and the position of a ship in the channel is difficult to determine except at the few points which are adequately marked and even these are difficult to follow at times of poor visibility. In time of war, it is highly desirable that a channel in friendly waters can be safely navigated under all conditions of visibility and preferably by means which do not easily betray the channel's location to an enemy.

This invention has for its primary object the provision of means for navigating a vessel precisely in shallow water and the limited confines of harbors, rivers, and other channels with a minimum of dependence on equipment and installations external to the vessel being navigated.

Another object of the invention is to provide a passive underwater marker for channels and traffic lanes which can be followed by any vessel equipped with a simple catacoustic system of reasonably high resolution.

Another object of the invention is to provide a channel navigation system whose components external to the vessel being navigated lie substantially on the water bottom and constitute no obstacle but rather a valuable aid to mine sweeping operations if such becomes necessary.

Basically, the invention consists of two components, viz., a reasonably high resolution catacoustical system associated with the ship and a ridge-like strip of acoustic reflecting material of nominal cross section (one or more inches) mounted slightly above or on the bottom of the water area to be navigated. The primary components of the catacoustic equipment are an electroacoustic transducer, a transmitter, a receiver, and a recorder. The primary requirement for the acoustic reflecting strip is that it be proud on the bottom, i.e., not buried, and made of any material with good acoustic reflecting properties such as steel cable, iron pipe, concrete, plastic, or even a ridge formed on the bottom as by plowing, and need not be continuous; indeed, predetermined discontinuities in reflecting properties, cros-sectional dimension, or the like, provide the capability of conveying information other than lateral position as will be pointed out hereinafter.

The aboard ship equipment preferred for practicing the invention utilizes a high resolution transducer having a vertically oriented fan shape beam directed toward the bottom abeam of the vessel, a transmitter for periodically energizing the transducer with high frequency pulses of very short duration, a receiver with suitable gain control for processing the response of the transducer to echoes returned from the bottom into signals of nearly constant level and recording means responsive to said signals for synthesizing a two dimensional visible display having line by line correlation with the forward movement of the ship and point by point correlation along a line of the ranges of the bottom area causing the returned echoes. Echoes from the reflecting strip will be longer than ordinary bottom reflections and when said strip protrudes above the bottom a certain minimum height no echo will be returned between the time transmitted pulse passes the crest of the strip and the time it again strikes the bottom beyond the strip so that the strip will appear on the display as a blank area immediately preceded by a strong signal and followed by an ordinary bottom return signal. A helmsman by maintaining the position of the strip on the display constant with relation to a preselected index can maintain his ship at a fixed distance from the channel marking strip The invention itself as well as other objects and advantages thereof will be readily apparent from the following description when considered in connection with the accompanying drawing in which:

FIG. 1 is a sectional view in perspective of a vessel navigating a channel with the aid of the invention;

FIG. 2 illustrates a fragment of a display record showing the bottom section recently traversed in FIG. 1;

FIG. 3 represents schematically a circuit and recording arrangement employed in the system of FIG. 1;

FIG. 4 shows the development of the scanning drum of the helical recorder of FIG. 3; and FIG. 5 is a plan view of a channel provided with a guidance strip in accordance with the invention.

Referring first to FIG. 5 there is represented the plan view of a ship channel wherein an acoustic reflecting strip 10 is laid on the bottom along the center line of the channel to be navigated. When the channel is too narrow to permit the simultaneous passage of two ships, the reflecting strip will be laid along one edge of the channel a preselected distance from the center line along which a vessel is to be navigated, the side of the channel chosen being always the same, such as corresponding to red buoys, i.e., on the starboard side for incoming vessels. As shown in FIG. 1, this reflecting strip 10 lies on the bottom 11 of a body of water 12 a predetermined distance from the center line of the channel to be navigated and some distance inside the channel's edge 13, it being assumed that this channel will accommodate but one vessel at a time, i.e., ships cannot pass.

In FIG. 1, a transducer 14 is shown extending down into the water 12 through the hull of a ship 15 for projecting compressional wave energy into the water and receiving echos returned from the bottom. This transducer 14 has a vertically oriented fan shaped directivity pattern 16 directed abeam of the ship 15 and having its longitudinal axis directed toward the bottom at an angle of declivity chosen so that it intersects the bottom 11 at an athwartship distance approximately equal to the distance of the reflecting strip 10 from the center line of the channel, or, in wide channels, the distance the reflecting strip 10 is from the intended course of the ship utilizing this navigational aid.

The transducer 14 may be any high resolution type but is preferably of the type disclosed by C. H. Jones in his application Ser. No. 20,230 filed Apr. 5, 1960, and assigned to the assignee of the present invention. The transducer disclosed in the above Jones application is elongated along a circle of latitude having a radius equal to the distance above the bottom the transducer is to operate so that when it is energized in phase it transmits compressional wave energy focused along a narrow strip on the bottom, i.e., along the polar axis defined by such circle of latitude.

The transducer 14 is preferably mounted on an adjustable support (not shown) so that the transducer 14 may be positioned at the desired operating heighth above the bottom to maintain approximately constant geometry so that the display can be easily interpreted. The ship's fathometer may be utilized for controlling the depth of the transducer 14 or the entire apparatus, other than the recorder, may be towed astern in a bottom contour following vehicle so that a permanent installation aboard a ship would not be necessary. The transducer 14 is connected to transmit-receive and recording apparatus 17 mounted aboard the ship 15 and may comprise as shown in the block diagram of FIG. 3 a transmitter 18 which through a transmit-receive switch 19 periodically energizes the transducer 14 to emit short pulses 21 of sonic energy in the directivity pattern indicated by the reference character 16. Separate transducers for transmitting and receiving may, of course, be employed. The intersection of each pulse 21 with the bottom 11 wipes or travels outwardly along the bottom so that the return echo signal due to bottom reflection is comparable to that received from flying spot scanning. This echo signal received by the transducer 14 is passed by the transmit-receive switch 19 to a receiver 22 equipped with a time varied gain amplifier as is well known to maintain substantially constant the receiver output voltage for application to a display device such as a helical recorder 23 which records the received signals on a suitable record medium 24. The elapsed time between the transmission of the pulse and a return signal is a function of the range of the point along the bottom reflecting the returned signal and therefore by suitable synchronization each line recorded by the helical recorder 23 on the record medium 24 is correlated along its length with the range along the ocean bottom. Such synchronization may be accomplished in a known manner by having the rotating scanning drum 25 of the helical recorder 23 trigger the transmitter 18, as indicated by a lead 26, as by a switching element 27 carried on the scanning drum 25 (see FIG. 4). Also as shown in the development of the scanning drum 25 in FIG. 4, a variable pitch helix 28 is preferably utilized to compensate for the variable speed of the intersection of the pulse 21 with the bottom 11 so as to obtain a recording which is linear with respect to the bottom 11. It is also desirable to advance the record medium 24 at a rate directly correlated with the ship's speed to provide a known relation between distance traveled and the length of the record 24.

The receiver 22 is adjusted so that the relatively weak signals derived from unencumbered bottom sections will be lightly recorded on the record medium 24 and stronger signals from bottom cluttering objects 29 as well as from the reflecting strip 10 will be more heavily recorded and there will be no signal and no recording between the time the scanning pulse 21 passes an object 29 or the reflecting strip 10 and again strikes the bottom beyond these objects. This no-signal period constitutes the acoustic shadow cast by an object proud on the bottom and since the geometry of the array is known, this continuous shadow provided by the reflecting strip 10 provides precise information with respect to the relative positions of the ship 15 and the reflecting strip 10. A helmsman need only pilot the ship to keep the shadow of the reflecting strip 10 at a predetermined position on the record 24 in order to maintain his ship's position a fixed distance from the bottom reflecting strip 10. As the record medium 24 is of the permanent type, it provides a history of the ship's movement through the channel. A fugitive record displayed on a cathode ray tube may of course be utilized if such history is not important.

In order to provide information with respect to the ship's position lengthwise of a channel as well as to indicate changes in the direction of the channel, the bottom reflecting strip 10 may be constructed so as to have differing reflecting characteristics along its length for these purposes. For instance, a large spherical section 31 may indicate a change in the course of the channel in one direction and a cubical shape 32 to indicate a change in the channel's course in the opposite direction. In addition, the position lengthwise of the channel may be further indicated by providing two or more of the spherical or cubical markers in accordance with a predetermined code. In long lengths of straight channel, position may be indicated by a tore 33 such as a tire casing which lends itself to ready identification on the record medium 24. Various other arrangements for providing position information can readily be encoded into the reflecting strip 10. As was pointed out above, the reflecting strip 10 may be of any elongated reflecting material having a vertical dimension of an inch or more but is preferably made of plastic material having some positive buoyancy so as to possess no tendency for burying itself and is held in position at the bottom by the spheres 31 and the cubes 32 which are preferably made of concrete or by tores 33 or other segments suitable weighted to function as anchors.

Although more sophisticated than actually required, one embodiment found satisfactory for practicing the invention utilized an operating frequency of 1.5 megacycles pulsed 25 times per second with a pulse length of 50 microseconds (about 3 inches in water) which provides resolution in range of about 3 inches and with the focused transducer above referred to, the azimuth resolution at 25 yards was about 3 inches. If it is assumed a ship traverses the channel at 4 knots (6.8 feet per second), the bottom will be scanned along adjacent strips having their centers spaced by approximately 3⅓ inches; thus, adjacent lines on the record medium 24 represent forward progress over the bottom a like distance. A one inch pipe gave consistent strong signals while pipes 3 inches and above in diameter provided strong signals followed by a shadow which made it easier to recognize.

The attenuation of sound in water increases rapidly with increase in frequency and at a frequency of 1.5 megacycles the effective range is of the order of 100 feet if reasonable power requirements are to be observed. The standard deviation in following a course increases with the size of the vessel and for large vessels, say over 5,000 tons, the approximately 100 foot range available is less than the standard deviation desired by most pilots who would much prefer a range of about 100 yards to feel confident of being able to keep the reflecting strip 10 within range and at all times visible on the record medium 24. The range can readily be increased by choosing a lower operative frequency, e.g., at 0.5 megacycles a range of 100 yards is readily attainable. At this frequency, the pulse length may remain the same to provide the above resolution in range; the pulse repetition rate is lowered to allow for the longer time required for the most remote echo to return, and a somewhat larger transducer employed for the same resolution in azimuth if desired. However, it is noted that except for the informational markers 31, 32, and 33, high resolution in azimuth is relatively unimportant.

Any difficulty in locating the channel marker of the invention when entering a channel may be obviated by making the deep water end of the marker 10 terminate in two diverging prongs 10', either one of which when picked up by an incoming vessel 34 will guide the vessel to the main channel marker 10.

After reading the foregoing detailed description of an exemplary embodiment for practicing the invention, it will be obvious to those skilled in the art that other embodiments are available for performing the essential functions required for practicing the invention. Accordingly, it is to be understood that the invention is not limited to the particular embodiments disclosed and suggested but is of the scope of the appended claims.

What is claimed is:

1. A channel defining system for aiding the navigation through a body of water of a vessel equipped with a high resolution pulsed catacoustic system adapted to scan the bottom in range abeam of the vessel comprising an elongated buoyant ridge-like strip of acoustic reflecting material extending lengthwise of the channel on the channel bottom and laterally spaced from the center line of the channel by a substantially constant known distance, and anchoring weights secured to said strip at spaced positions along its length.

* * * * *